United States Patent [19]

Mainer

[11] 3,876,178

[45] Apr. 8, 1975

[54] PRESSURE RELEASE VALVE

[76] Inventor: William J. Mainer, 12214 N. 23rd St., Phoenix, Ariz. 85022

[22] Filed: Dec. 21, 1973

[21] Appl. No.: 427,055

[52] U.S. Cl. .................. 251/295; 251/321; 251/323
[51] Int. Cl. ............................................ F16k 31/62
[58] Field of Search .................... 251/321, 323, 295

[56] References Cited
UNITED STATES PATENTS

| 1,367,246 | 2/1921 | Ewald | 251/321 X |
| 1,629,496 | 5/1927 | Fraser | 251/321 X |
| 2,205,774 | 6/1940 | Goldkamp | 251/323 X |
| 2,775,401 | 12/1956 | Storrs | 251/321 X |

Primary Examiner—Arnold Rosenthal

[57] ABSTRACT

A pressure release valve entitled "Curtis Pressure Release Valve" is designed for Brake coupling operation. The valve is attached to an air line on the ground in the railroad yard or at a railroad siding track for coupling to the car brake line.

1 Claim, 3 Drawing Figures

PATENTED APR 8 1975   3,876,178
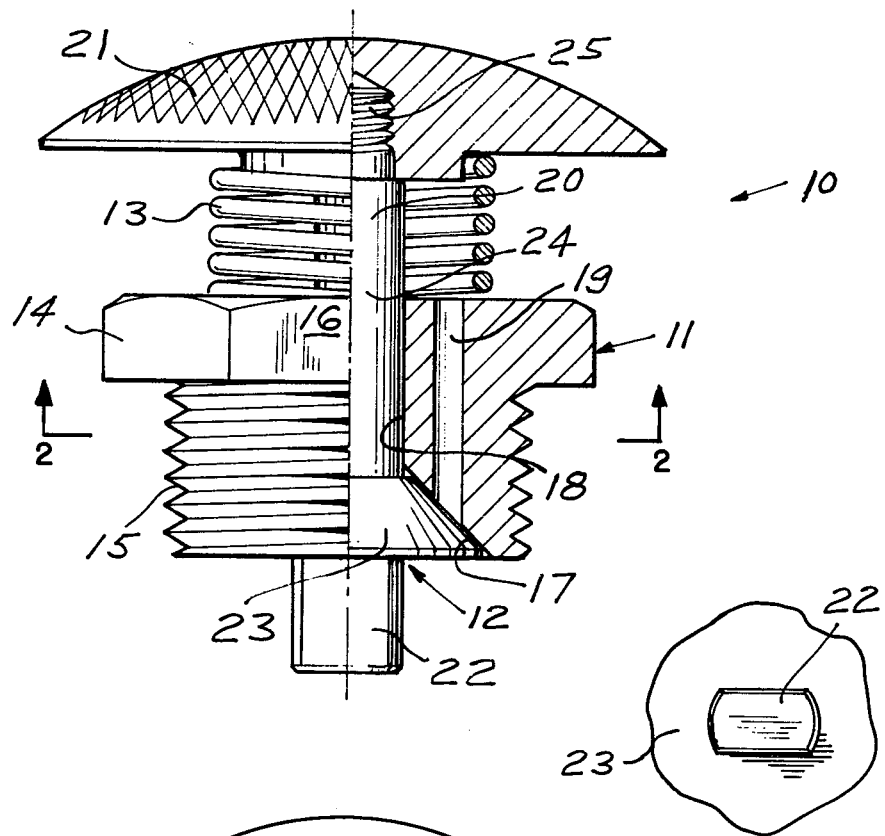
FIG. 1
FIG. 3
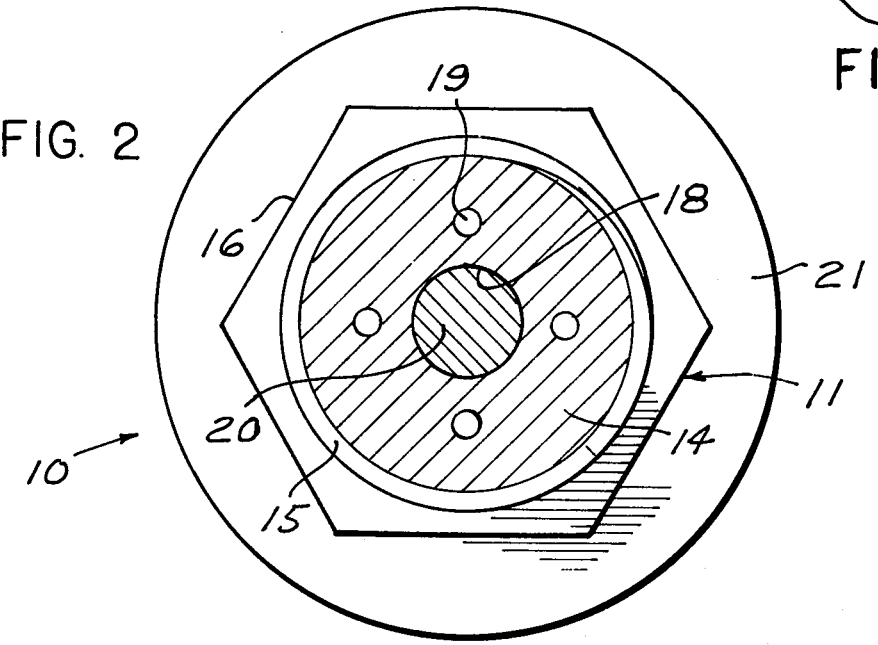
FIG. 2

PRESSURE RELEASE VALVE

This invention relates to railroad equipment, and more particularly to railroad operation connected with car braking.

A principal object of this invention is to provide a pressure release valve for use in railroad brake coupling operations that attaches to the air lines on the ground in the yard or at a siding track and to which the brake lines from the railroad car are coupled. Use of the valve eliminates many injuries caused by the air pressure in the lines and also make management of the lines easier. The valve comprises a nut threaded for attachment to an air line and a spring-loaded, pedal-operated air release pin.

Another object of the present invention is to provide a valve that is constructed of few parts, cheaply reproduced in quantity due to relatively simple machining, yet possess ruggedness, dependability and ease of maintenance for many years of service.

These and other objects will become evident upon a study of the following specification and the accompanying drawing, wherein:

FIG. 1 is a half section elevation view;

FIG. 2 is a bottom plan section view taken on the line 2—2 of FIG. 1.

FIG. 3 is a lower end view.

Referring to the Figures, the valve 10, according to the invention, comprises a stationary nut member 11, a moveable valve member 12 and a compression spring 13.

Member 11 serves a triple function of attachment, valve-seating and an air escape port. The body 14 is threaded at 15 for a standard one and five eighths inch U.S. pipe thread to a depth of approximately three quarters of an inch. A nut portion 16 is preferably made standard with a width between flats of two and seven eighth inches. A valve seat 17 is centered on a clearance hole 18. Arranged cymeterically around hole 18, four air escape ports 19 are provided.

Moveable valve pin assembly 12 comprises a post 20 and pedal 21. Post 20 is integrally formed with a standard double-flat pin 22 preferably formed in the geometry of a five eighths diameter pin having three eighth inches between flats, a valve portion 23 conforming to valve seat 17, a stem portion 24 slideably engaged in bore 18 and a threaded tip 25 secured in a corresponding threaded opening in pedal 21.

Pedal 21 is preferably cut one eighth inch deep in a typical diamond pattern non-slip surface.

In assembly, as clearly seen in FIG. 1, spring 13 is placed between pedal 21 and nut 11 before assembling the threaded parts.

In operation, valve 10 is threaded into the air line, which action brings pin 22 against the head of the air line valve. Depressing pedal 12 causes pin 22 to depress the air line valve thereby permitting braking air to be safely passed through ports 19 and out side ways underneath pedal 21. It becomes apparent from the Figures, the preceeding description and operation that air release for braking is not only made safe for the brakemen who does not have to handle the air hoses release directly and dangerously, but also makes the operation manageable simply and reliably.

What I now claim is:

1. A pressure release valve for installation on an air line along a railroad yard ground or along a siding track, comprising in combination, a nut which at one end is of hexagnal configuration and which at its other end has an external thread that is engageable within a threaded opening of said air line, a circular central bore along an axis of said nut, one end of said bore having a conical shaped counter bore forming a valve seat, a cylindrical shaped post slideable within said bore, a longitudinal intermediate portion of said post incorporating a conically flaired portion forming a valve body for fitting against said valve seat, said cylindrical portion of said post being longer than a thickness of said nut, a terminal portion adjacent said cylindrical portion of said post being reduced in diameter and including an external thread engaged within a threaded opening along an axis of a large diameter, circular pedal, said threaded opening being on one side of said pedal, said threaded opening being on one side of said pedal while an opposite side thereof is convexly rounded and a surface thereof is diamond pattern grooved for non skid purposes, a compression coil spring around said cylindrical portion of said post, one end of said compression coil spring bearing against the first said side of said pedal and an opposite side of said compression coil spring bearing against said end of said nut having said hexoganel configuration, and an opposite terminal end of said post which is located adjacent said conically flaired portion is provided with double flats parallel to each other and located on opposite sides thereof, said nut including a plurality of axially extending air escape ports extending there through and positioned around said central bore, one end of said air escape ports communicating with said counter bore, whereby axial movement of said post unseats said valve body from said valve seat allowing air to escape through said ports.

* * * * *